United States Patent Office 2,945,745
Patented July 19, 1960

2,945,745

PREPARATION OF FLUORINE COMPOUNDS

David H. Reeve, Lakeland, Fla., assignor to International Minerals & Chemicals Corporation, a corporation of New York No Drawing. Filed Dec. 30, 1957, Ser. No. 705,766

4 Claims. (Cl. 23—88)

The present invention relates to a method of removing phosphorus impurities from materials containing fluorine compounds. More particularly, the invention relates to a method of preparing fluorine compounds substantially free of phosphorus impurities from fluosilicic acid obtained as a by-product from processes involving a chemical treatment of phosphorus-containing minerals to make useful phosphatic materials.

Phosphorus-containing minerals such as fluorapatite and phosphate rock are used as raw materials in the manufacture of fertilizers, phosphoric acid and phosphates, as well as other phosphorus-containing materials. Fluorapatite is a mineral, which is a phosphate of lime containing varying amounts of fluorine. Phosphate rock is a mineral which consists of more or less impure non-crystalline calcium fluorphosphate. These minerals also contain various amounts of silica and iron, as well as other compounds. When such phosphorus-containing minerals are chemically treated with an acid, such as phosphoric acid or sulfuric acid, which treatment is relatively common in preparing useful materials from these minerals, silicon tetrafluoride is liberated. Silicon tetrafluoride is also liberated when wet process phosphoric acid prepared from phosphate rock or fluorapatite is concentrated by evaporation techniques. The liberated silicon tetrafluoride is usually recovered by absorption in water. When the silicon tetrafluoride is dissolved in water, fluosilicic acid, $H_2SiF_6$, results.

Fluosilicic acid, prepared in this manner, or by other methods, however, contains various impurities such as silica, iron compounds and phosphorus compounds. For some purposes, fluosilicic acid containing such impurities may be used directly, that is, without further purification. For some purposes, however, it is necessary to remove the impurities, or at least to reduce their concentration substantially since the presence of such impurities in the final product may be very detrimental and may even preclude the intended use of the product.

Cryolite, which is a sodium aluminum fluoride, $Na_3AlF_6$, is a mineral which occurs naturally or which may be synthetically prepared. Cryolite was first used industrially for the manufacture of alumina and soda. Since the development of the Hall process for the production of aluminum, large amounts of this material have been used in this process. The Hall process utilizes a bath of fused cryolite for the electrolyte in which alumina is disassociated by an electric current. It is, however, desirable that the cryolite used in the Hall process have a phosphorus impurity concentration below 0.2% by weight (calculated as weight percent of $P_2O_5$). It is also desirable that the cryolite have an iron concentration below 0.4% (calculated as $Fe_2O_3$), and a silicon content below 0.7% (calculated as $SiO_2$).

Some relatively successful methods have been devised for reducing iron and silica concentrations; however, considerable difficulty has been encountered in removing phosphorus. The present invention is concerned with this problem.

An object of the present invention is to provide a method of removing phosphorus impurities from fluorine-containing materials contaminated therewith.

Another object of the present invention is to provide a method of preparing substantially phosphorus-free fluorine compounds from fluosilicic acid obtained as a by-product from processes involving a chemical treatment of phosphorus-containing minerals, such as fluorapatite and phosphate rock.

A further object of the invention is to provide a method of preparing substantially phosphorus-free synthetic cryolite from fluorine materials containing phosphorus impurities.

A more specific object of the invention is to provide a method of preparing substantially phosphorus-free synthetic cryolite using as a raw material fluosilicic acid obtained as a by-product from processes involving the acid treatment of phosphate rock.

These and further objects of the present invention will be apparent from the following detailed description of the invention.

In the specification and claims, it is set forth that phosphorus, and/or fluorine, and/or silicon are present in various of the materials. The phosphorus, and/or fluorine, and/or silicon are, however, not present as elemental phosphorus and/or elemental fluorine and/or elemental silicon, but are combined with other elements. The phosphorus occurs mainly as the phosphate and the fluorine may be present as various fluorides or other compounds. The silicon is usually present as silica, $SiO_2$; however, it may also be present as other compounds. Further, the concentration of the phosphorus is given in terms of phosphorus pentoxide ($P_2O_5$) in accordance with accepted usage, although it is to be understood that the phosphorus is usually present as other compounds.

I have discovered, and the invention is based on this discovery, that substantially phosphorus-free fluorine material may be prepared from fluorine materials contaminated with phosphorus, even such large amounts of phosphorus that the fluorine and phosphorus are present in equal weights, when following the process of this invention. The present invention makes some use of the techniques of fractional crystallization; however, the manner in which these techniques are applied in the present invention is novel.

Briefly, the present invention comprises a process for preparing a substantially phosphorus-free fluorine material from fluosilicic acid solution containing phosphorus which includes the steps comprising adding ammonia to the fluosilicic acid to obtain a pH within the range of from about 1 to about 7 to effect the formation of ammonium fluosilicate and separating the ammonium fluosilicate from the ammoniated solution.

The starting material in the present invention is, therefore, a fluosilicic acid solution which contains phosphorus as an impurity. The process of this invention may also be used to prepare fluorine materials from fluosilicic acid containing phosphorus as well as other impurities such as, for example, silica and iron. This will be apparent to those skilled in the art as the description of the invention progresses.

The process of the present invention may, of course, be used to purify fluorine materials other than fluosilicic acid, however, in accordance with this invention, these other fluorine materials are first converted to fluosilicic acid. For example, a gas containing phosphorus and silicon tetrafluoride may be used to prepare a substantially phosphorus-free fluorine material. One of the first steps will be to scrub the gas with water to produce an aqueous fluosilicic acid solution which will be contaminated with phosphorus.

As hereinbefore set forth, in the chemical treatment of fluorapatite or phosphate rock and during the evaporation of wet process phosphoric acid, a gas containing silicon tetrafluoride as well as phosphorus and silicon impurities is evolved. These gases are scrubbed with water to recover the fluorine thereby forming an aqueous solution of fluosilicic acid contaminated with phosphorus and silicon. The solution will usually contain less than about 50 grams of phosphorus (calculated as $P_2O_5$) per liter.

In accordance with the present invention, ammonia is added to this solution of fluosilicic acid to raise the pH to within the range of from about 1 to about 7. The ammonia may be added as the gas or an aqueous solution of ammonium hydroxide may be used. At pH values within this range, phosphoric acid, $H_3PO_4$, reacts with ammonia to produce ammonium phosphate, $$NH_4H_2PO_4$$

At pH values within this range fluosilicic acid, $H_2SiF_6$, reacts with ammonia to produce ammonium fluosilicate $(NH_4)_2SiF_6$. The ammonia addition is preferably effected to obtain a pH within the range of from about 2.5 to about 4.5. A pH above about 2.5 is preferred since at pH values below this, it has been found that only small amounts of ammonium fluosilicate are formed. Further, at pH values below about 2.5 it has been determined that the subsequent separation of the phosphorus and fluorine is often unsatisfactory. A pH value of about 4.0 for the lower pH limit is still more preferred since at pH values below 4.0 some of the fluorine may be lost as $SiF_4$ in the subsequent evaporation step. The upper pH value of 4.5 is preferred, since at pH values above this, lower yields of ammonium fluosilicate are usually obtained. While the reason for this has not been definitely established, it appears that at pH values above 4.5 the following reaction occurs:

$$2H_2O + 4NH_3 + 2(NH_4)_2SiF_6 \rightarrow (NH_4)_2SiF_6 + 6NH_4F + SiO_2$$

The aqueous solution of fluosilicic acid may contain some silicon as an impurity and when ammonia is added to the solution to obtain the desired pH, some of this silicon may precipitate out of solution as silica. This precipitated silica is removed from the solution by any suitable method such as filtration.

In accordance with the present invention, the ammonium fluosilicate is separated out of the solution after the removal of silica therefrom. It is preferred to separate the ammonium fluosilicate from the solution by crysallization techniques in which the ammonium fluosilicate is crystallized and the crystals filtered or centrifuged from the mother liquor. In some instances, especially where the concentration of the fluosilicic acid is high, when ammonia is added to the fluosilicic acid solution, crystals of ammonia fluosilicate may immediately be formed which may be separated from the mother liquor. Crystals of ammonium fluosilicate may also form when the ammoniated solution is cooled.

The filtered aqueous solution of fluosilicic acid, which usually contains phosphorus in an amount of less than about 50 grams (calculated as weight of $P_2O_5$) per liter may, however, be heated, preferably to the boiling point to evaporate water and to concentrate the solution. The evaporation of the water usually is performed at atmospheric pressure, however, vacuum evaporation may also be used if desired. The evaporation of water from the aqueous solution is continued until about one-tenth of the original volume is obtained or a concentration of phosphorus of at least about 50 grams (calculated as weight of $P_2O_5$) per liter is obtained. If the filtered solution was heated to evaporate the water, the solution is permitted to cool to ambient temperature. In the event that vacuum evaporation techniques are used, the solution may already be at ambient temperature. At ambient temperature, usually within the range of 18 to 32° C., crystals of ammonium fluosilicate precipitate out of solution.

The crystals of ammonium fluosilicate may be removed from the mother liquor or solution by any suitable method, which is preferably a filtration or centrifugation. It has been found that the crystals have substantially no included impurities but contain substantial amounts of occluded mother liquor. It has also been found that the occluded mother liquor may readily be washed out of the crystals. The crystals are, therefore, washed with pure water or with water containing ammonium fluosilicate to lower the concentration of the phosphorus contaminant in the crystals to preferably below 0.05% (calculated as weight percent of $P_2O_5$). The wash water will contain some ammonium fluosilicate and it, therefore, is desirable to recirculate the wash water to some of the earlier steps of the process; for example, the wash water may be used to scrub the gases. The washed ammonium fluosilicate crystals are substantially pure and free of phosphorus impurities.

The mother liquor, in addition to containing substantially all of the phosphorus impurity, also contains some fluorine, usually 5 to 6%, and it may be desirable to recover this fluorine from the mother liquor. One preferred method of recovering the fluorine is to ammoniate the mother liquor to a pH within the range of from about 9 to about 11, and preferably to a pH of about 10 whereby triammonium phosphate is precipitated out of the solution. The precipitate of triammonium phosphate is removed from the solution by any suitable method, such as filtration, and the filtrate is recycled to the first ammoniation step.

To prepare a substantially phosphorus-free aqueous solution of ammonium fluoride or substantially phosphorus-free cryolite, the washed ammonium fluosilicate crystals are dissolved in water and ammonia added to obtain a pH of about 8.0 or above. At pH's of greater than about 8.0, the following reaction takes place:

$$2H_2O + (NH_4)_2SiF_6 + 4NH_3 \rightarrow 6NH_4F + SiO_2$$

The silicon dioxide may be removed from the solution by any suitable means such as filtration or centrifugation, thereby producing a substantially pure solution of ammonium fluoride.

The ammonium fluoride solution may then be reacted with sodium aluminate to produce cryolite which precipitates from the solution. The cryolite is recovered and may be subsequently used in any process requiring substantially pure cryolite. Cryolite prepared as set forth above usually contains 0.01% or less of phosphorus (calculated as weight of $P_2O_5$), 0.65% or less of silicon (calculated as $SiO_2$) and 0.01% or less of iron (calculated as $Fe_2O_3$).

As illustrative of the character of the instant invention but in no wise intending to be limited thereby, the following example is given:

*Example*

During the mixing of phosphate rock with sulfuric acid in a process for producing superphosphate fertilizer, a gas containing silicon tetrafluoride was released. This gas was scrubbed with water to absorb the silicon tetrafluoride thereby producing an aqueous solution of fluosilicic acid.

The aqueous solution had the following analysis:

$H_2SiF_6$ ------ 284.45 grams per liter.
F ---------- 260.7 grams per liter.
Si ---------- 68.50 grams per liter (calculated as $SiO_2$).
P ---------- 3.36 grams per liter (calculated as $P_2O_5$).

Ammonia gas was bubbled into the solution until a pH of about 4.5 was attained. The ammoniated solution was heated to the boiling point and evaporation permitted to concentrate the solution. The concentrated solution was cooled to room temperature and 123.6 grams of ammonium fluosilicate crystals were formed and removed by filtration. The crystals had the following analysis:

| | Percent |
|---|---|
| $SiO_2$ | 15.72 |
| F | 36.6 |
| $P_2O_5$ | 0.002 |
| $NH_4$ | 8.47 |

The filtrate was further concentrated by boiling and when the concentrated filtrate was again cooled to room temperature 361.4 grams of ammonium fluosilicate crystals were formed and removed from the mother liquor by filtration. These crystals had the following analysis:

| | Percent |
|---|---|
| $SiO_2$ | 32.7 |
| F | 62.6 |
| $P_2O_5$ | 0.019 |
| $NH_4$ | 20.6 |

The remaining filtrate had the following analysis:

| | Grams/liter |
|---|---|
| $NH_4$ | 17.9 |
| $SiO_2$ | --- |
| F | 89.8 |
| $P_2O_5$ | 6.60 |

The two batches of crystals were mixed and washed with water. 200 grams of the crystals were then dissolved in water and ammonia gas was added until a pH of 8.0 was reached. A precipitate formed at this pH which was separated by filtration. The filter cake had the following analysis:

| | Percent |
|---|---|
| $SiO_2$ | 84.87 |
| F | 15.70 |
| $P_2O_5$ | 0.002 |
| $NH_4$ | 1.72 |

The filtrate was diluted to 1400 ml. and mixed with $NaAlO_2$, thereby forming a precipitate of cryolite. 198 grams of cryolite were removed by filtration and analyzed as follows:

| | Percent |
|---|---|
| Na | 32.8 |
| $Al_2O_3$ | 23.5 |
| $Fe_2O_3$ | 0.01 |
| $SiO_2$ | 0.65 |
| $P_2O_5$ | 0.024 |
| F | 47.6 |

The filtrate had the following analysis:

| | Grams/liter |
|---|---|
| $NH_4$ | 10.80 |
| F | 8.30 |
| $P_2O_5$ | 0.0017 |
| Na | 19.6 |

This example illustrates the preparation of a relatively phosphorus-free material from a fluosilicic acid solution containing substantial amounts of phosphorus.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. In a process for preparing substantially phosphorus-free fluorine material from an aqueous fluosilicic acid solution containing phosphorus in solution, the steps comprising adding ammonia to said fluosilicic acid solution to obtain a pH within the range of from 2.5 to 7.0 and below the pH where a substantial amount of ammonium fluoride is formed, to effect the formation of ammonium fluorosilicate, and separating ammonium fluosilicate crystals from the ammoniated solution.

2. In a process for preparing substantially phosphorus-free fluorine material from an aqueous fluosilicic acid solution containing phosphorus in solution, the steps comprising adding ammonia to said fluosilicic acid solution to obtain a pH within the range of from 2.5 to about 4.5 to effect the formation of ammonium fluosilicate, and separating ammonium fluosilicate crystals from the ammoniated solution.

3. In a process for preparing substantially phosphorus-free fluorine material from an aqueous fluosilicic acid solution containing phosphorus in solution, the steps comprising adding ammonia to said fluosilicic acid solution to obtain a pH within the range of from about 4.0 to about 4.5 to effect the formation of ammonium fluosilicate, and separating ammonium fluosilicate crystals from the ammoniated solution.

4. In a process for preparing substantially phosphorus-free fluorine material from an aqueous fluosilicic acid solution containing phosphorus in solution in an amount below 50 grams (calculated as weight of $P_2O_5$) per liter, the steps comprising adding ammonia to said fluosilicic acid solution to obtain a pH within the range of from 2.5 to about 4.5 to effect the formation of ammonium fluosilicate, evaporating the ammoniated solution until the phosphorus concentration is at least about 50 grams (calculated as weight of $P_2O_5$) per liter, and separating ammonium fluosilicate crystals from the concentrated solution.

References Cited in the file of this patent

UNITED STATES PATENTS

| 1,235,552 | Chappell | Aug. 7, 1917 |
| 2,075,370 | Strathmeyer | Mar. 30, 1937 |
| 2,780,524 | Gloss et al. | Feb. 5, 1957 |
| 2,785,953 | Fitch | Mar. 19, 1957 |

FOREIGN PATENTS

| 876,558 | France | Aug. 10, 1942 |